United States Patent [19]
Brion

[11] 3,779,183
[45] Dec. 18, 1973

[54] TIRE INCINERATOR
[75] Inventor: Jacques Brion, Velizy-Villacoublay, France
[73] Assignee: Commissariat a L'Energie Atomique
[22] Filed: May 12, 1972
[21] Appl. No.: 252,549

[30] Foreign Application Priority Data
May 13, 1971 France .............................. 7117311

[52] U.S. Cl............................................. 110/18 R
[51] Int. Cl. ............................................. F23g 7/00
[58] Field of Search .................... 110/7 R, 8 R, 8 A, 110/18 R

[56] References Cited
UNITED STATES PATENTS
3,565,021  2/1971  Hill ........................................ 110/7

Primary Examiner—Kenneth W. Sprague
Attorney—Paul M. Craig, Jr. et al.

[57] ABSTRACT

The incinerator is designed to burn whole tires representing 100 percent of the charge. A hearth which is smaller in width than the diameter of the tires to be burned has longitudinal vertical walls provided with lateral orifices for the admission of combustion air. A charging lock-chamber having internal dimensions slightly larger than the dimensions of a vertical tire has a sloping floor along which the tire rolls into the hearth and remains vertical. The combustion chamber of the incinerator is fitted with nozzles for the injection of air in order to induce high turbulence.

10 Claims, 5 Drawing Figures

TIRE INCINERATOR

This invention relates to a tire incinerator.

Conventional incinerators burn tires without difficulty, provided that the tires themselves constitute only a small fraction of the charge to be burned. When the proportion of tires to be burned increases to the point at which it represents 100 percent of the charge, it is observed that this results in intense production of smoke black, in progressive deterioration of the refractory materials, in catching of the steel cables derived from the cord reinforcements of the tires and in explosions which take place in the ash pits.

The aim of this invention is to provide an incinerator which is capable of burning 100 percent of tires without any of the disadvantages just mentioned and which is designed to burn the tires in the whole state without cutting them up into pieces.

The incinerator in accordance with the invention essentially comprises on the one hand a hearth which is smaller in width than the diameter of the tires to be burned and which has longitudinal vertical walls provided with lateral orifices for the admission of combustion air, on the other hand a charging lock-chamber having internal dimensions slightly larger than the dimensions of a tire in the vertical position and provided with a bottom wall or floor which is inclined towards the combustion chamber, and finally a combustion chamber fitted with nozzles for the injection of turbulence air.

By means of the inclined floor of the charging lock-chamber, the tires are permitted to roll towards the combustion chamber under the action of gravity. The tires burn in the hearth in a substantially vertical position, with the result that the lateral orifices for the admission of combustion air are not closed-off by the charge either partially or wholly. In consequence, the tire receives a suitable air flow at all points, thus providing the conditions of very complete combustion. This is not the case with a conventional hearth-type incinerator in which the tires are placed flat against the horizontal grid and partially close-off the air admission orifices.

The tires are loaded in the vertical position by means of a lock-chamber and this avoids the need to put the combustion chamber into communication with the atmosphere as each loading operation takes place. As a result, even during the loading operations, the combustion chamber can be maintained at reduced pressure while preventing any abrupt admission of cold air. Complete control over the conditions of combustion is therefore maintained and any damage to masonry as a result of thermal shock is prevented. In spite of these arrangements, the tires contain a quantity of carbon black which is released progressively as the combustion takes place and which is sometimes considerable, with the result that it cannot be burned instantaneously and completely within the hearth proper. For this reason, the hearth is associated with a combustion chamber provided with turbulence air injection nozzles. The effect of this injection is to supply the secondary air which is necessary for combustion of the carbon black and at the same time to produce agitation and mixing of the gases, thus promoting complementary combustion of the carbon black.

The incinerator further comprises a charging lock-chamber which is separated from the combustion chamber by a vertically-sliding leak-tight door, said door being secured to a rigid frame having an inclined end-wall so designed as to be in alignment with said charging lock-chamber and with an orifice of said combustion chamber when said door is in the open position, thus establishing a communication between the charging lock-chamber and the combustion chamber.

Finally, said charging lock-chamber is surmounted by shutters which are capable of pivoting about horizontal and parallel axes.

Further properties and advantages of the invention will become apparent from the following description of one form of construction and from the accompanying drawings, wherein.

Figure 1:
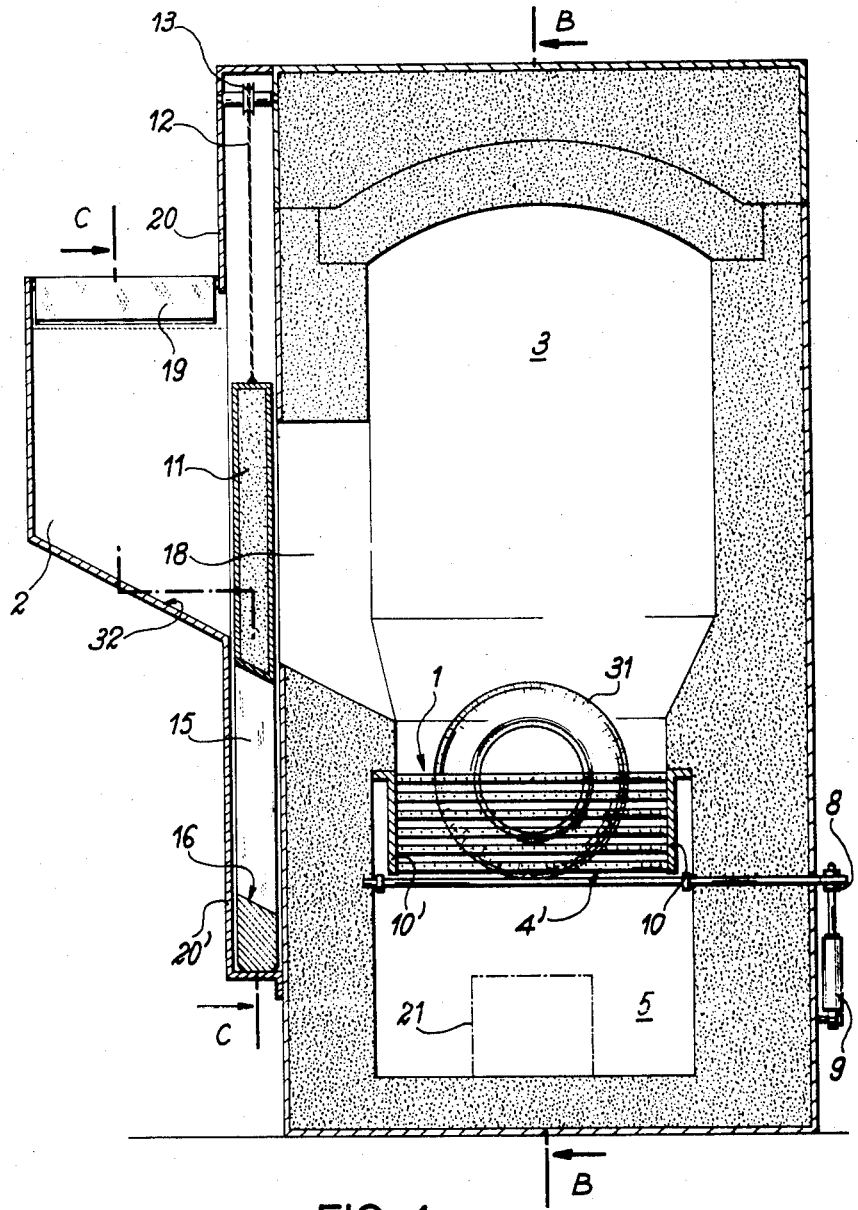
FIG. 1 is a vertical longitudinal sectional view of the incinerator along line A—A of FIG. 2, the charging lock-chamber being shown in the position of communication with the atmosphere.

The incinerator according to the invention comprises a hearth 1, a charging lock-chamber 2, a combustion chamber 3.

The hearth 1 is surrounded by two walls 4, 4' provided with air admission openings which can advantageously have an arrangement in the form of venetian blinds. The openings formed in said walls can have any desired shape such as circular openings or slits, for example. Said openings can also be constituted by an assembly of rods spaced at intervals so as to form openings.

The base of the hearth 1 is constituted by one or a number of plates which are capable of withdrawing so as to permit the combustion residues and especially the steel cables to fall into an ash pit 5.

Figure 2:
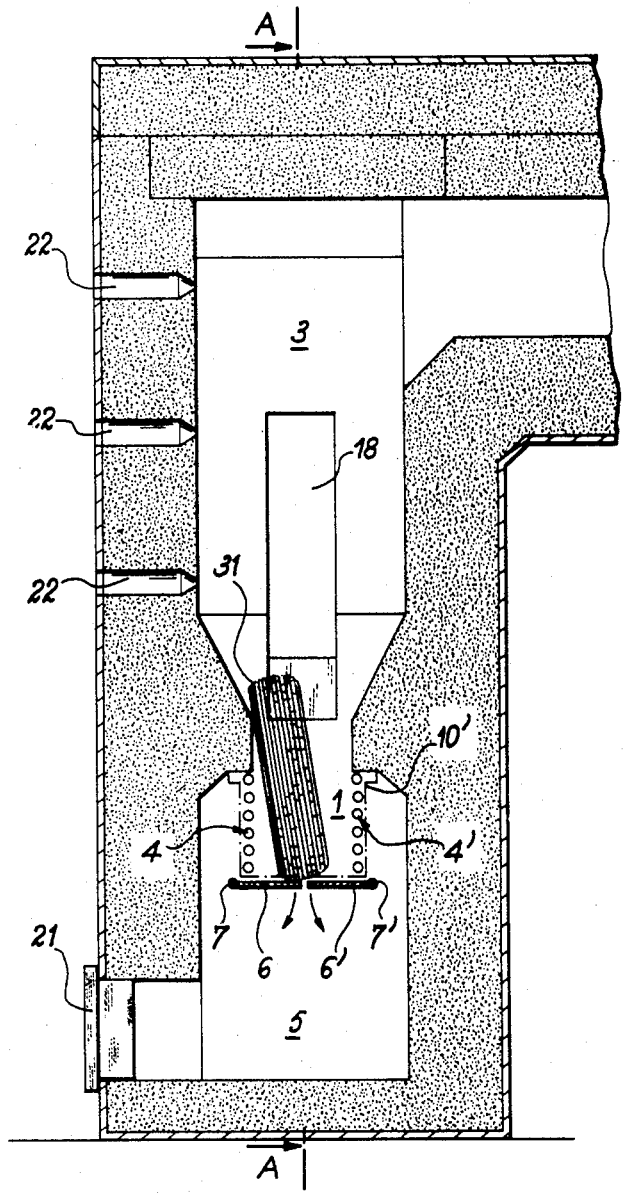
FIG. 2 is a vertical transverse sectional view of the incinerator along line B—B of FIG. 1.

There are shown in FIG. 2 two solid plates 6, 6' which are rigidly fixed to horizontal pins 7, 7'. The pins 7, 7' extend to the exterior of the masonry and are operated by means of link-rods 8 and jacks 9 or by any other known mechanical means. Solid plates 10, 10' form the transverse walls of the hearth.

In an alternative form of construction, the solid plates 6, 6' and 10, 10' are provided with orifices for the passage of air or are constituted by an assembly of rods without thereby departing from the scope of the invention.

The end products of combustion are withdrawn by hand from the ash pit 5 by means of a door 21. In an alternative form of construction, the ash pit 5 is constructed in the form of a hopper and the ashes fall under gravity into a discharge container (not shown in the drawings).

The charging lock-chamber 2 is designed to contain a whole, unfragmented tire 31 in the vertical position. The internal dimensions of the lock-chamber are slightly larger than those of said tire and said lock-chamber is isolated from the combustion chamber 3 by means of a door 11 formed by a structure of conventional type for reducing the heat radiation from the combustion chamber 3 towards the exterior, said door being constituted in particular by insulating refractory materials or by a metallic box which is cooled by a circulation of water. The door 11 is suspended from a cable 12 which is connected to a winch (not shown in the figures) by means of a guide pulley 13. In an alternative form of construction, the door 11 is connected to any other known mechanical device such as a mechanical, hydraulic or pneumatic jack which is capable of displacing the door 11 in the upward direction for opening and in the downward direction for closure.

The door 11 is secured to a rigid frame 15 having an inclined end-wall 16 and two vertical side-walls 17, 17'. When the door 11 is in the open position as shown in FIGS. 4 and 5, the rigid frame 15 connects the charging lock-chamber 2 to the orifice 18 of the combustion chamber 3.

The charging lock-chamber 2 comprises an inclined floor 32 which slopes towards the hearth so that the tire 31 rolls into the combustion chamber 3 solely under the action of gravity when the door 11 is opened.

Figure 3:
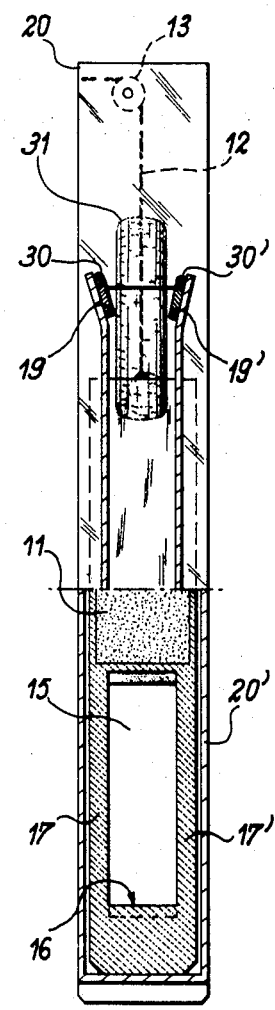
FIG. 3 is a vertical sectional view of the charging lock-chamber along line C—C of FIG. 1.
Figure 5:
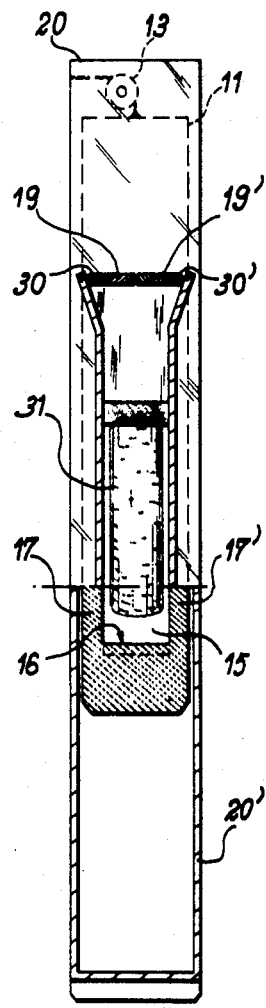
FIG. 5 is a vertical sectional view of the charging lock-chamber along line D—D of FIG. 4, as shown in the position of communication with the combustion chamber.
Figure 4:
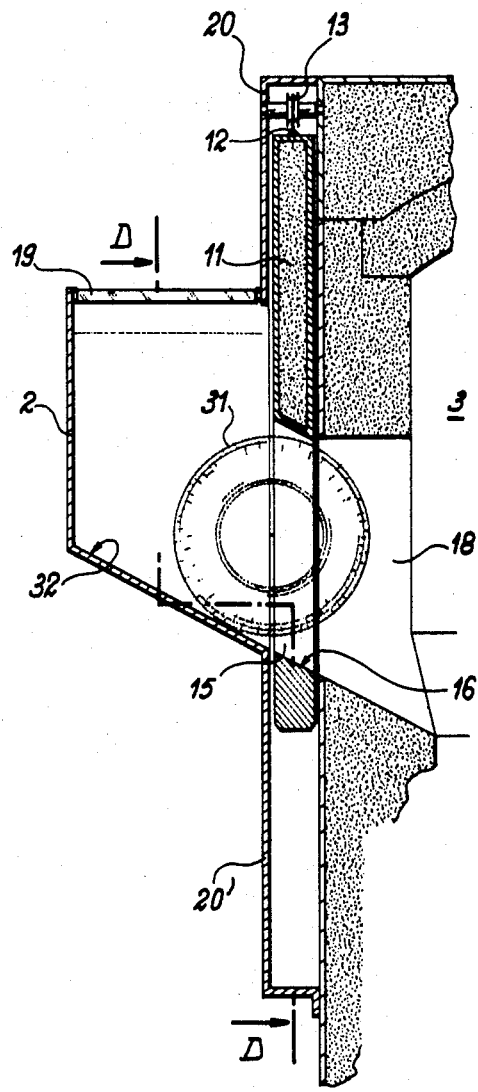
FIG. 4 is a vertical sectional view of the charging lock-chamber along line A—A of FIG. 2, as shown in the position of communication with the combustion chamber.

The charging lock-chamber 2 is isolated from the atmosphere by means of a pair of shutters 19, 19' which are capable of pivoting about horizontal pins 30, 30' to the open position shown in FIGS. 1 and 3, and to the closed position shown in FIGS. 4 and 5. The pivotal shutters 19 and 19' are operated by known mechanical means such as link-rods and jacks which are not illustrated in the figures.

In an alternative form of construction, the door 11 opens in a movement of downward displacement, in which case the rigid frame 15 is placed above the door 11. Alternatively, said door opens in a movement of lateral displacement, in which case the rigid frame is placed on one side of the door. In all cases, the orifice 18 of the combustion chamber 3 is aligned with the rigid frame 15 when the door 11 is in the open position.

In the form of construction which is illustrated, the door 11 and the adjacent rigid frame 15 are intended to move within a sheet-metal guide 20, 20' which is joined to the charging lock-chamber 2 in leak-tight manner. In an alternative form of construction, said sheet metal guide can be dispensed with.

Finally, the combustion chamber 3 is provided with nozzles 22 for the injection of air at high pressure.

The operation of the incinerator in accordance with the invention is as follows:

In order to load a tire 31, the following cycle of operations must be performed:

opening of the pivotal shutters 19, 19' placing of the tire 31 within the charging lock-chamber 2 (shown in FIG. 3)

closure of the pivotal shutters 19, 19' opening of the door 11 by means of the cable 12; under the action of gravity, the tire rolls down the sloping end-wall 16 of the rigid frame 15 and passes into the combustion chamber 3 (as shown in FIGS. 4 and 5)

closure of the door 11.

These operations can be performed by hand or controlled automatically so that each operation is carried out in dependence on the preceding operation in accordance with known means.

The cycle can be initiated by means of a push-button or by means of an auxiliary contact actuated by a pyrometric couple located within the combustion chamber. In the case just mentioned, the loading operations are fully automatic.

Once the tire 31 is in the hearth 1 (as shown in FIG. 1), air under pressure (10 to 30 millibars) is injected into the combustion chamber 3 by means of nozzles 22, the flow rate through said nozzles being between 5 and 25 percent of the total flow rate of combustion air. The air discharged at high velocity at each nozzle outlet results in high turbulence within the combustion chamber. This has the effect on the one hand of mixing the stream-lines of reducing gases charged with carbon black with the stream-lines of oxidizing gases and on the other hand of activating the combustion reactions without cooling the gases since the flow of injected air is of low value in comparison with the total volume of combustion air and since said flow is largely employed for the exothermic reactions of secondary combustion.

At the outlet of the combustion chamber 3, the combustion gases are directed into a post-combustion chamber and if necessary through a hot-gas filter before being discharged to the atmosphere.

The invention is clearly not limited in any sense to the form of construction which has been described with reference to the accompanying drawings and has been given solely by way of example. In particular, said incinerator, which is intended to burn whole tires without cutting them into pieces, can also serve to burn all types of combustible refuse, the incinerator being completed in that case by a charging device of a type known per se and adapted to said combustible refuse.

What we claim is:

1. A tire incinerator, comprising: a hearth defined by spaced longitudinal vertical walls, the width of said hearth as defined by said walls being smaller than the diameter of a tire to be incinerated, lateral orifice means provided in said walls for the admission of combustion air into said hearth, a combustion chamber, nozzles for injecting tubulent air into said combustion chamber, a charging lock-chamber including spaced wall portions defining said chamber, the internal dimensions of said lock-chamber as defined by said wall portion being slightly larger than the dimensions of a tire to be incinerated when the tire is disposed in a vertical position, and an inclined bottom wall or floor provided in said lock-chamber which is inclined towards said combustion chamber for guiding a tire to be incinerated into said combustion chamber.

2. A tire incinerator according to claim 1, wherein an orfice is provided between said combustion chamber and said lock-chamber, a vertically sliding leak-tight door is provided to separate said combustion chamber from said charging lock-chamber, said leak-tight door is secured to a rigid frame, said frame is provided with an inclined end-wall adapted to be brought into alignment with said charging lock-chamber and with said orifice of said combustion chamber when said leak-tight door is in an open position.

3. A tire incinerator according to claim 1, wherein shutters are pivotally mounted on said lock-chamber opposite said inclined bottom wall or floor, said shutters being pivotable about horizontal axes.

4. A tire incinerator according to claim 1, wherein an ash pit is provided below said hearth, at least one movably mounted door is provided for opening and closing the lower portion of said hearth to discharge combustion residue into said pit, and wherein an opening is provided in said ash pit for removal of combustion products therefrom.

5. A tire incinerator according to claim 2, wherein shutters are pivotally mounted on said lock-chamber opposite said inclined bottom wall or floor, said shutters being pivotable about horizontal axes.

6. A tire incinerator according to claim 2, wherein an ash pit is provided below said hearth, at least one movably mounted door is provided for opening and closing the lower portion of said hearth to discharge combustion residue into said pit, and wherein an opening is provided in said ash pit for removal of combustion products therefrom.

7. A tire incinerator according to claim 4, wherein two doors are provided for opening and closing the lower portion of said hearth and wherein means are provided for selectively controlling the opening and closing of said two doors.

8. A tire incinerator according to claim 7, wherein each of said two doors are mounted on horizontal pin means for movably supporting each of said doors, and wherein said means for selectively controlling said two doors include link means operatively connected to said horizontal pin means and jack means operatively connected to said link means for selectively moving said link means to open and close said two doors.

9. A tire incinerator according to claim 4, wherein means are provided for selectively controlling the opening and closing of said at least one door.

10. A tire incinerator according to claim 9, wherein said at least one door is mounted on horizontal pin means for movably supporting said door and wherein said means for selectively controlling said at least one door include link means operatively connected to said horizontal pin means and jack means operatively connected to said link means for selectively moving said link means to open and close said at least one door.

* * * * *